2,777,856

PROCESS FOR CHLORINATING A BASIC CYCLIC GUANIDINE

Arthur J. Stokes, Washington, D. C.

No Drawing. Application November 29, 1944,
Serial No. 565,783

5 Claims. (Cl. 260—309.5)

(Granted under Title 35, U. S. Code (1952), sec. 266)

My invention relates to the chlorination of basic amides and is exemplified by the preparation of N-chloroureas by chlorination of their base compounds.

It has been customary in the preparation of N-chloroureas to chlorinate basic amides such as iminoglycolurils, iminohydantoins, and pyrimidines by suspending the starting compounds in water and then reacting the suspension with gaseous chlorine. A similar method involves suspension of the base compound in a buffer solution followed by reaction of the suspension with gaseous chlorine. These methods suffer from the serious disadvantage that the extent of chlorination is not readily controllable for they generally yield a product which is either underchlorinated or is a mixture of compounds chlorinated to different degrees. For example, the following formulae show how the chlorination of several representative basic amides can take several courses:

In the chlorination of iminoglycolurils of the following type:

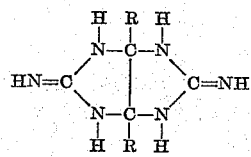

in which R can be any organic radical, the chlorine can enter any one or several or all six positions occupied by hydrogen. Similarly, in the chlorination of iminohydantoins of the following type:

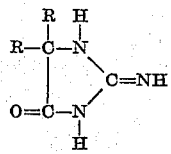

in which R can be any organic radical, the chlorine can enter any one or more or all three of the positions occupied by hydrogen. As a third illustration, in the chlorination of a pyrimidine of the following type,

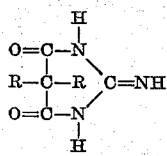

in which R can be any organic radical containing an amino group the chlorine can enter either or both of the positions occupied by the hydrogen.

From the above three types of compounds it will be apparent what I mean by the term basic amide. Basic amides, broadly, are compounds having in addition to an amide group, or a nitrogen group which behaves like an amide group, a nitrogen group which reacts with an acid to form a salt.

It is the primary object of my invention to provide a method of chlorinating basic amides in which the chlorination takes place readily and yields a single product.

It is a secondary object of my invention to provide a process which is easy to control, is operative at relatively low temperatures and yields the desired final chlorinated product.

Other objects and advantages of my invention will in part be obvious and in part appear hereinafter.

My invention comprises a method of chlorinating basic amides and involves the several steps and the relation of one or more of such steps with respect to each of the others, thereof, which will be exemplified in the process hereinafter disclosed and the scope of the invention will be indicated in the claims.

Since chlorinated basic amides, or N-chloroureas broadly, have anti-vesicant value, it is often describle to prepare stable chlorinated derivatives of basic amides for such use. In particular, it has been found that chlorinated phenyl iminoglycolurils are good anti-vesicants for they form relatively stable chlorine derivatives or N-chloroureas which release chlorine slowly and deactivate vesicants coming in contact with them. Particularly good anti-vesicants are chlorine derivatives of 7,8-diphenyl-2,5-diiminoglycoluril. Inasmuch as the hexachloro derivative is relatively unstable and the tetrachloroderivative is relatively stable, it is of considerable interest in the preparation of chlorinated 7,8-diphenyl-2,5-diiminoglycoluril to have the final product composed of the tetrachloro derivative only. The presence of the hexachloro derivative in a preparation containing the tetrachloro derivative causes the mixture to have a stability considerably below that of the pure tetrachloro derivative.

In accordance with my invention I can prepare chlorinated basic amides of high stability by chlorinating the salt of the base compound in an aqueous medium to a given degree. For example, I have prepared stable tetrachloro 7,8-diphenyl-2,5-diiminoglycoluril having over 31% active chlorine content by chlorinating the hydrochloride of 7,8 - diphenyl-2,5-diiminoglycoluril in an aqueous medium. Samples of the preparation having over 31% active chlorine lost only from 1 to 2% of their active chlorine when heated at 150° for 3 hours. The theoretical chlorine content of tetrachloro-7,8-diphenyl-2,5-diiminoglycoluril is 33%.

When chlorinating the basic amide as an aqueous solution of its salt, the chlorine absorption is very rapid and yields a product in substantially quantitative amount uncontaminated by higher chlorine derivatives and substantially free of lower chlorine derivatives. Suitable acids to use in forming the soluble salt of the basic amide are hydrochloric, phosphoric, nitric, acetic and, generally, any acid which will form a soluble salt with the basic amide to be chlorinated. The method of practicing my invention will be more clearly understood by reference to the following examples in which the parts given are parts by weight:

*Example 1*

Twenty-six parts of 7,8-diphenyl-2,5-diiminoglycoluril was dissolved in 640 parts of water by the addition of 19 parts of concentrated (37%) hydrochloric acid and 0.25 part of "Aerosol OT" dioctyl ester of sodium sulfosuccinic acid (25%) solution. The clear solution was well agitated and gaseous chlorine added to the solution as rapidly as it was absorbed until the reaction was completed as indicated by testing the solution of the salt for unreacted starting material. This was done by alkalizing the solution; formation of a percipitate of the starting material indicated incomplete reaction. The precipitated chlorinated diphenyl iminoglycoluril was filtered, washed, dried and identified as 1, 3, 4, 6-tetrachloro-7,8-diphenyl-2,5-diiminoglycoluril of the following structural formula:

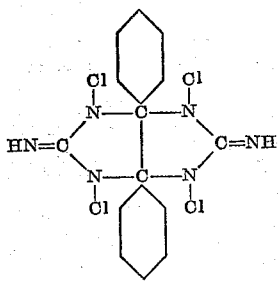

The total yield was 35.7 parts, amounting to a yield of 95% on the basis of the quantity of glycoluril used as starting material. The chlorine efficiency of the process was 83% based on the amount of chlorine recovered in the product compared with the amount fed into the reactor.

The concentration of the hydrochloride in the solution is not critical. It may vary from a dilute solution to a saturated one. The temperature during reaction should not be permitted to go much above 50° C.

A more rapid chlorination is obtained by the method described in the following example:

*Example II*

Five hundred parts of water was saturated with chlorine. A solution of 9 parts of 7,8-diphenyl-2,5-diiminoglycoluril in 80 parts of water containing 7 parts of hydrochrloric acid (27%) was prepared and gradually added to the saturated chlorine water simultaneously with the rapid addition of free chlorine, that is, chlorine was added as fast as it could be absorbed. Chlorine was passed into the solution for an additional period to complete the chlorination as indicated by the test of the solution for unreacted base. A 96% yield of product 1,3,4,6-tetrachloro-7,8-diphenyl-2,5-diiminoglycoluril on the basis of starting material, was obtained with a chlorine efficiency of 85% on the basis of the amount of chlorine passed into the reactor.

*Example III*

Twenty-two parts of 5,5-diphenyl-2-iminohydantoin was dissolved in 600 parts of water by the addition of 10 parts of 35% hydrochloric acid. Chlorine gas was passed into the solution as fast as it could be absorbed until a sample of the reaction medium gave no precipitate upon addition of strong alkali in amount sufficient to alkalize it. The precipitated chlorinated product was filtered, washed well with water, dried and identified as 1,3-dichloro-5,5-diphenyl-2-iminohydantoin of the following structural formula:

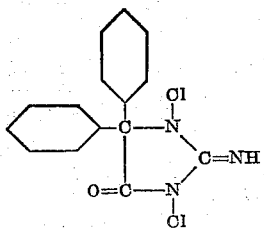

Twenty-two parts of the chloroamide containing 21.8% active chlorine was obtained representing an 80% yield on the basis of the starting compound.

*Example IV*

Twenty-four parts of 5-($\beta$-aminoethyl)-5-isoamyl barbituric acid was dissolved in 500 parts of water by the addition of 10 parts of 35% hydrochloric acid. Chlorine gas was passed into the solution at a rapid rate for 15 minutes. The precipitated chloroamide was filtered, washed well with water, dried and identified as 1,3-dichloro-5-($\beta$-amino-ethyl)-5-isoamyl barbituric acid of the following structural formula:

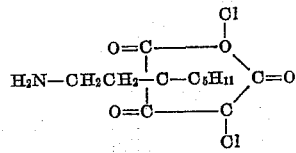

Twenty-six parts of the chlorinated product containing 20.1% active chlorine was obtained, representing an 85% yield on the basis of the starting compound.

Following the above procedures in all the essential steps, corresponding and analogous chlorinations were carried out on the same and related compounds in phosphoric, nitric and acetic acids. These acids, and no doubt others, form salts of the basic amides which are sufficiently soluble to enable the preparation of a reaction medium containing a desirable concentration of the salt of the basic amide and do not of themselves complicate the process by side reactions.

The relationship of this chlorination process of my invention to the purification process for basic amides invented by Homer W. Carhart and Peyton C. Teague and disclosed in United States patent application Serial Number 476,930, filed February 24, 1943, now Patent No. 2,596,102, is illustrated by the following detailed description of one method for the preparation and isolation of 7,8-diphenyl-2,5-diiminoglycoluril:

Two hundred parts of 95.5% ethanol, 43 parts of benzil and 42 parts of guanidine carbonate were placed in a reactor equipped with a reflux condenser and agitator. The mixture was stirred and heated to 70° C., maintained at that temperature for about 45 minutes, then refluxed for 7 hours, cooled and filtered. The reaction which occurred can be summarized by means of the following equation:

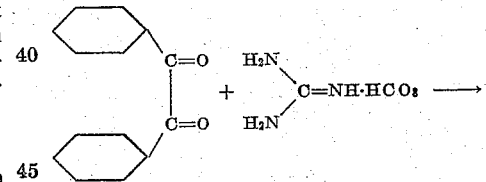

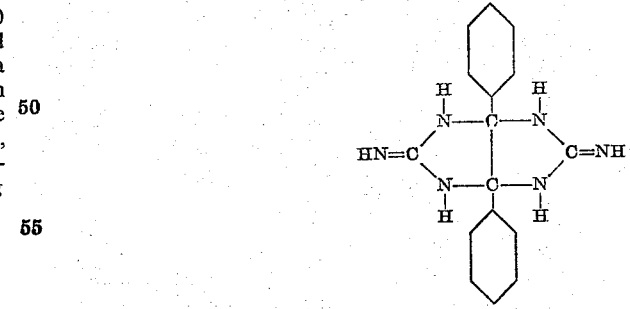

The separation of the bases in the crude filter cake which included 5,5-diphenyl-2-iminohydantoin, was accomplished in the following manner: The crude cake was slurried in about 320 parts of water at about 20° C. Concentrated hydrochloric acid was added slowly until the foaming produced by liberated carbon dioxide had stopped. In all, about 35 parts of the hydrochloric acid was needed. An additional 300 parts of water was then added. More acid, about five parts, was added to give the solution a pH of 1.48. Sodium hydroxide solution, about 5 parts of 25% solution, was stirred into the acid solution to produce a solution of pH 4.03. A precipitate formed and filtration yielded 7.25 parts of 5,5-diphenyl-2-imino-hydantoin. Addition of 10 parts of 25% sodium hydroxide solution to the filtrate increased the pH to 8.01. Filtration yielded 4.25 parts of a material which remained unidentified. The desired compound, namely, 7,8-diphenyl-2,5-diiminoglycoluril at this point remains in solution together with excess reagents used in the process. Addition of 20 parts of 25% sodium hydroxide solution, bringing the pH to a value of 11–12 precipitated the 7,8-diphenyl-2,5-diiminoglycoluril from solution.

The glycoluril thus prepared was free from contamination by other closely related compounds. As pointed out in the application of Carhart and Teague, Serial Number 476,930, this is a relatively general method of separating amino compounds of different basicities.

The glycoluril thus prepared can be subjected to a chlorination process like those described in Examples I or II to give a chlorinated derivative useful as an antivesicant.

It is understood that should it be desired to prepare a chlorine derivative of a compound not of itself a basic amide or acid soluble compound according to the principles and method described above, the compound can be rendered basic to make it acid soluble by a preliminary amination step to introduce a basic group into the compound. This is indicated in the third group of type compounds defined as coming within the scope of my invention where the R substituent in the pyrimidine type of compound is defined as one containing an amino group.

Since certain changes may be made in carrying out the above process without departing from the scope of my invention, it is intended that all matter contained in the above description shall be interpreted as illustrative and not in a limiting sense. It is also to be understood that the following claims are intended to cover all of the generic and specific features of the invention herein described and all statements of the scope of the invention which, as a matter of language, might be said to fall therebetween.

The invention described herein may be manufactured and used by or for the Government of the United States of America for government purposes without the payment of any royalty thereon or therefor.

Having described my invention what I claim as new and desire to secure by Letters Patent of the United States is:

1. A method of chlorinating only the ring nitrogen atoms of a basic cyclic guanidine in which all of the nitrogen atoms are directly linked to a reactive hydrogen atom which comprises dissolving the cyclic guanidine compound in aqueous acid to form a solution of the acid salt of the cyclic guanidine and reacting the resulting solution with chlorine.

2. A method of chlorinating only the ring nitrogen atoms of an iminoglycoluril in which all of the nitrogen atoms are directly linked to a reactive hydrogen atom which comprises dissolving the iminoglycoluril compound in aqueous acid to form a solution of the acid salt of the iminoglycoluril compound and reacting the resulting solution with chlorine.

3. A method of forming the tetrachlor derivative of 7,8-diphenyl-2,5-diiminoglycoluril to the exclusion of higher chlor derivatives thereof which comprises dissolving said diiminoglycoluril in aqueous acid to form a solution of the acid salt of said diiminoglycoluril and reacting the resulting solution with chlorine.

4. The method as defined in claim 3, wherein the acid is hydrochloric acid.

5. A method of chlorinating only the ring nitrogen atoms of an iminohydantoin in which all of the nitrogen atoms are directly linked to a reactive hydrogen atom which comprises dissolving the iminohydantoin compound in aqueous acid to form a solution of the acid salt of the iminohydantoin compound and reacting the resulting solution with chlorine.

References Cited in the file of this patent

FOREIGN PATENTS 148,821    Austria _____ Mar. 10, 1937

OTHER REFERENCES

Chemical Abstracts, 25, page 5400[5].